T. A. HOOVER.
AUTOMOBILE BUMPER.
APPLICATION FILED JULY 12, 1916.

1,221,800.

Patented Apr. 3, 1917.

WITNESSES.

INVENTOR
Thos. A. Hoover.
BY Strong & Townsend
ATTORNEYS

UNITED STATES PATENT OFFICE.

THOMAS A. HOOVER, OF FRESNO, CALIFORNIA.

AUTOMOBILE-BUMPER.

1,221,800. Specification of Letters Patent. Patented Apr. 3, 1917.

Original application filed January 24, 1912, Serial No. 673,140, now Patent No. 1,191,306, dated July 18, 1916. Divided and this application filed July 12, 1916. Serial No. 108,818.

*To all whom it may concern:*

Be it known that I, THOMAS A. HOOVER, a citizen of the United States, residing at Fresno, in the county of Fresno and State of California, have invented new and useful Improvements in Automobile-Bumpers, of which the following is a specification.

This invention relates to improvements in bumpers for vehicles and particularly to bumpers used upon self-propelled vehicles, such as automobiles; and an object of this invention is to provide an automobile bumper which will be simple in construction, comparatively cheap in manufacture, efficient and durable in use and susceptible of ready repair in case it is broken, or otherwise injured. Another object of this invention is to provide a bumper of the character described which will not rattle and which will be susceptible of easy adjustment and which may be readily connected with the proper parts of the automobile, such as the frame-members or chassis. A third object of this invention is the provision of a bumper which will yield in all directions and which will absorb the shock of impact upon striking an obstacle. Other features of this invention will be pointed out in the description and claims which follow.

Figure 1:
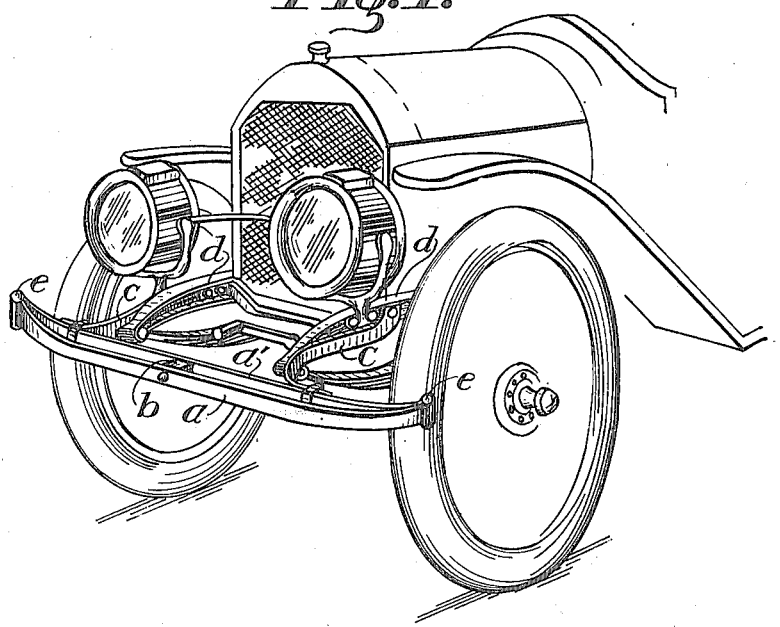

In the drawings illustrating the principle of this invention and the best mode now known to me of applying that principle, Figure 1 is a perspective view of the front portion of an automobile equipped with my new bumper.

Figure 2:
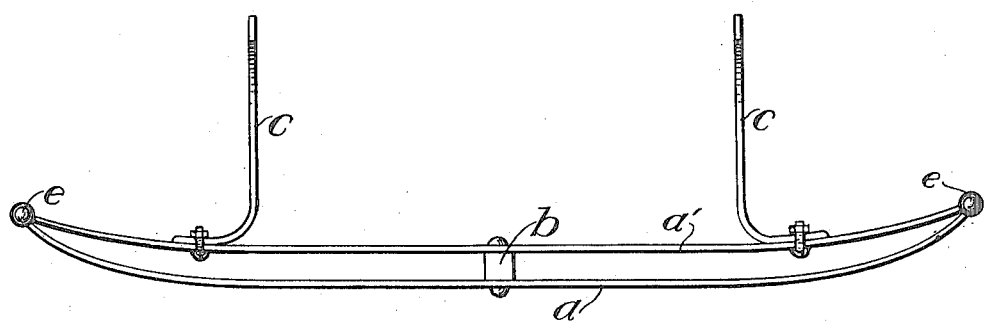

Fig. 2 is a detail showing in plan the form of bumper illustrated in Fig. 1.

In the form illustrated, the front portion of the bumper is in a single piece bent to form an elongated loop the front and rear sides, respectively, of which are the spring-steel bars $a$—$a'$ centrally disposed between which is a separator-block $b$. To the rear bar $a'$ is suitably secured, by clips as shown, or otherwise, a pair of rearwardly-extending arms $c$ by means of which the bumper is fastened to the angle-irons $d$ forming a part of the frame or chassis of the vehicle (Fig. 1). At the ends of the integral bars $a$—$a'$ are formed eyes lined with bushings and containing double-head pins or rivets $e$, the heads of which are of such size and shape as to cover the upper and lower faces of the turned ends.

This bumper being made of spring steel throughout, will yield readily to forces exerted upon it in any direction; and, if from any cause, it becomes bent or broken, it may be readily repaired, which is not the case with the square, tubular and channel bumpers now common in use.

The bumper thus constructed is made up in quantity and carried in stock; the detached brackets serving the purpose of adapting the bumper to any make or style or size of machine. This is a great advantage both to the manufacturer and user, as well as to the dealer. Heretofore it has required a different bumper for every make and size of car, thereby adding to the cost and causing delay and annoyance where a bumper suited to the particular need of a customer, could not be quickly supplied on demand.

The bumper as a whole is therefore artistic in design and shape and is not only an effective guard or fender, but also is an ornamental attachment to any machine.

The materials and finish of the several parts of the device are otherwise such as the judgment and experience of the manufacturer may dictate.

It is to be understood that various changes in form, proportions and minor details of construction may be resorted to within the scope of the appended claims and that I do not wish to limit myself to the specific design and construction here shown.

This application is a division of my original application Serial No. 673,140, filed January 24, 1912, and which was issued July 18, 1916, as Patent No. 1,191,306.

Having thus described my invention what I claim and desire to secure by Letters Patent is—

1. A spring bumper comprising a pair of transversely extending spaced bars integrally united at their ends and having inherent yielding qualities substantially throughout their length, and means adapting this bumper for attachment to cars having varying widths of frame members.

2. A spring bumper comprising a front and rear spring bar, said bars being interspaced and positioned parallel with relation to each other, and means securing the outer ends of the bars together.

3. A bumper comprising a pair of spring bars disposed parallel with each other and having their outer ends united, said bars being bent near their outer ends, and a block interposed between the bars.

4. A spring bumper embodying a pair of spaced continuous bars set on edge and integrally connected at their ends, and means formed independent of the bars for attaching the bumper to a vehicle, said means being formed to engage opposite sides of the bar that lies adjacent the vehicle and engaging in the space between the bars.

5. A spring bumper embodying a pair of integral continuous straight spaced bars arranged in parallelism and having their ends curved, the extremities of the bars being formed into tubular terminals and lying flat and in contacting relation at the inner sides of said tubular terminals, rivets extending through the tubular terminals to reinforce the latter, and brackets formed independently of the bars for attaching same to a vehicle, said brackets having parts which grip one of the longitudinal edges of the inner bar, and opposite side faces of said inner bar and being disposed in the space between the bars.

6. A spring bumper embodying spaced resilient front and rear bars, set on edge and joined at their ends, a spacing block interposed between the bars midway between their ends, and yieldable brackets removably secured to one bar at spaced points one between each end of the bar and the block, said brackets comprising spring bars set on edge and having their outer ends outturned to lie flat against the bar.

7. A spring bumper embodying a pair of continuous parallel spaced spring bars connected at their ends, and means formed independent of the bars for attaching the bumper to a vehicle.

In testimony whereof I have hereunto set my hand in the presence of two subscribing witnesses.

THOMAS A. HOOVER.

Witnesses:
W. W. HEALEY,
M. E. EWING.